UNITED STATES PATENT OFFICE.

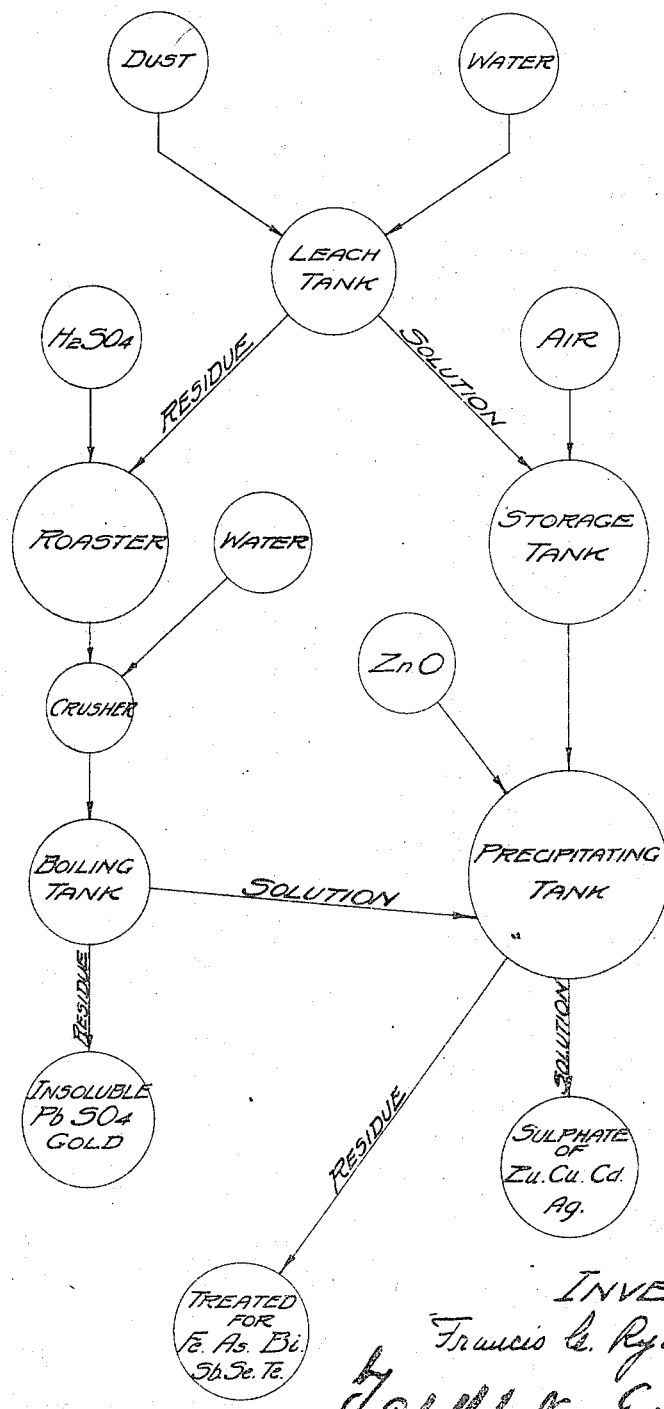

FRANCIS C. RYAN, OF HAMMOND, INDIANA, ASSIGNOR OF ONE-HALF TO UNITED STATES METALS REFINING COMPANY, OF CHROME, NEW JERSEY, A CORPORATION OF NEW JERSEY.

METHOD OF TREATING FLUE PRODUCTS.

1,182,320.      Specification of Letters Patent.      Patented May 9, 1916.

Application filed February 24, 1914. Serial No. 820,650.

*To all whom it may concern:*

Be it known that I, FRANCIS C. RYAN, a citizen of the United States, residing at Hammond, in the county of Lake and State of Indiana, have invented certain new and useful Improvements in Methods of Treating Flue Products; and I do hereby declare the following to be a full, clear, and exact description of the invention, such as will enable others skilled in the art to which it appertains to make and use the same.

The invention relates to a method of treating flue-products from roasting or smelting operations or other similar finely divided mineral bearing materials for the recovery of the metallic values contained therein.

The object of the invention is to provide a novel and improved method which will enable a high percentage of the values contained in materials treated, and especially of the silver, copper and zinc, to be recovered more economically and with less danger to the operators than heretofore.

In the accompanying drawing the several steps of the preferred form of method are diagrammatically illustrated.

The invention will be further explained in connection with its application to the treatment of fume or flue-dust from ore treating furnaces. These finely divided materials which contain sulfates, oxids, and metallic forms of the various metals and elements constituting the ores or furnace products treated, are first leached with hot water to extract all water soluble compounds such as the sulfates of zinc, arsenic and iron. The liquor containing these compounds is drawn off into a suitable tank, heated and blown with air to facilitate oxidation particularly of the iron. After the water soluble compounds have been removed, the residue is roasted with an excess of sulfuric acid which is preferably added while the residue is still in a thoroughly moistened condition. The excess of sulfuric acid present insures the complete sulfation of the metals or metallic compounds excepting the silicia and gold, and aids in the solution of basic anhydrous salts of iron, copper, zinc, etc., which may be present in the material which is being roasted, and also insures an acid working condition for the subsequent treatment of the material. The roasted materials are then crushed (preferably wet crushed) and boiled with a limited amount of water. Owing to the excess of sulfuric acid in the roast, the boiling is in an acid solution. This is important, since it insures a more complete solution and consequent separation of the soluble compounds, and also prevents the formation and precipitation of insoluble basic sulfates which would otherwise occur. The solution which carries the sulfates of silver, copper, zinc, iron, etc., is separated from the insoluble compounds by filtration. The residue which contains the insoluble lead sulfate, the gold and the silica, may then be treated by any suitable metallurgical method for recovery of the lead and gold. The sulfate liquor is then treated in a precipitating tank, and at this stage in the process the liquor collected in the storage tank from the first leaching above described is preferably added to the sulfate liquor. This is desirable since it collects the materials to be treated, and at the same time the water from the storage tank decreases the percentage of free sulfuric acid in the collected liquids. The acidity of the liquor in the precipitating tank is then nearly neutralized by the addition of a suitable neutralizing agent, preferably zinc oxid, the free sulfuric acid being reduced to such an extent that the precipitation of basic salts is efficiently accomplished. By this treatment the iron, bismuth, arsenic, antimony, selenium and tellurium are precipitated, while the sulfates of zinc, copper, silver and cadmium remain in solution. The precipitate and solution are then separated by filtration, and the solution thus freed from impurities is treated by accepted metallurgical methods for the recovery of the zinc, silver and copper. The filtrate may also be treated for the recovery of any values contained therein.

While it is preferred to employ all the steps described in treating the materials from which the values are to be recovered, this is not essential to certain features of the invention, and it will be understood that certain steps of the complete process may be employed with advantage even if one or more of the other steps are omitted. For instance, the leaching with water before roasting with excess of sulfate acid is desirable, although not essential, and in case the material being treated is first leached with water, the solution thus obtained may be separately treated, although it is preferred to add this liquor to the sulfate liquor in the precipitating tank, as above described.

Having explained the nature and object of the invention, and specifically explained one manner in which it may be practised, what is claimed is:—

1. The method of treating flue products or other finely divided mineral bearing materials consisting in roasting the materials with excess of sulfuric acid, boiling the roast in an acid solution, separating the solution, precipitating basic salts by the addition of sufficient quantity of a neutralizing agent to leave the solution slightly acid, and separating the solution from the precipitate for further treatment to recover the metallic values therein.

2. The method of treating flue products or other finely divided mineral bearing materials consisting in leaching the materials with water, blowing the resulting liquor with air, roasting the residue with excess of sulfuric acid, boiling the roasted materials in a limited amount of water, separating the liquor therefrom, adding the solution from the first leaching to the liquor, precipitating basic salts by adding a neutralizing agent, and separating the solution from the precipitate for further treatment to recover the values therein.

3. The method of treating flue products or other finely divided mineral bearing materials consisting in leaching the materials with water, roasting the residue with excess of sulfuric acid, boiling the roasted materials with a limited amount of water, separating the liquor therefrom, reducing the acidity of the liquor to precipitate the basic sulfates of such elements as iron, arsenic, antimony, bismuth and tellurium while holding the zinc, copper, silver, and cadmium in solution, and separating the solution from the precipitate for further treatment to recover the values therein.

4. The process of treating oxidized mineral bearing material, comprising roasting the material with a sufficient amount of strong sulfuric acid to insure an acid condition of the roasted material, adding water to the roasted material and boiling under an acid condition, filtering, reducing the acidity of the solution to a slightly acid condition to precipitate impurities and separating the solution for a subsequent treatment for zinc.

FRANCIS C. RYAN.

Witnesses:
W. H. GOSTLIN, Jr.,
JOHN N. BECKMAN.

Copies of this patent may be obtained for five cents each, by addressing the "Commissioner of Patents, Washington, D. C."